(12) United States Patent
McCreary

(10) Patent No.: US 6,396,039 B1
(45) Date of Patent: May 28, 2002

(54) FOCUSING FILAMENT FOR AUTOFOCUS SYSTEM

(75) Inventor: Jeffrey C. McCreary, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/266,256

(22) Filed: Mar. 11, 1999

(51) Int. Cl.[7] .................................................. G02B 7/04
(52) U.S. Cl. ................................ 250/201.2; 250/201.3; 359/381
(58) Field of Search .......................... 250/201.2, 201.3, 250/201.4, 201.7, 201.8, 559.28, 559.27, 559.44, 559.45; 359/381, 383, 368, 372, 442; 356/4.03, 4.04, 4.05, 239.1, 239.7

(56) References Cited

U.S. PATENT DOCUMENTS 4,980,763 A * 12/1990 Lia ............................. 358/98
5,239,170 A * 8/1993 Hughlett ..................... 20/201.3

* cited by examiner

*Primary Examiner*—Que T. Le
*Assistant Examiner*—Thanh X. Luu
(74) *Attorney, Agent, or Firm*—Angela N. Nwaneri; Maurice M. Klee

(57) ABSTRACT

An inspection system for and a method of inspecting defects on opposite sides of a glass specimen are set forth wherein a focusing filament is positioned in the light path of an inspection system having an objective lens. The filament is focused to the same plane that the objective lens uses to image a defect on the glass surface, so as to produce a shadow of the filament in the field of view when the objective is focused on either a front or back surface of the specimen. The utilization of the focusing filament provides an absolute surface reference that can automatically compensate for variations of the glass specimen position relative to a plane.

25 Claims, 5 Drawing Sheets

FOCUSING FILAMENT FOR AUTOFOCUS SYSTEM

BACKGROUND OF THE INVENTION

The invention relates to an automatic focusing system for an inspection apparatus which is particularly adapted for the inspection of glass sheet. One of the problems with conventional auto focusing systems is that they do not inherently provide a reference for the sample surface. That is, most of the prior art auto focusing systems rely on maximizing the edge contrast of a particle or inclusion in glass which provides a sharp image of the individual particle. However, such focusing did not yield any information about the location of the particle relative to the surface of the glass. For surface or depth information, these known techniques often rely on a calibrated axis that is parallel to the optical axis, which requires the glass to be held in a fixed plane. Other techniques, utilizing laser, rely on reflecting rays of light off the glass surface. While these techniques do compensate for variations from a fixed plane, they are limited to high magnification objectives, such as larger than 20×, which have a narrow depth of focus and short working distances, both of which can be a problem when inspecting generally large pieces of glass such as in the range of 550×650 mm to about 850×900 mm.

During the inspection of such relatively large sheets of glass, it is difficult if not impossible to hold such large pieces in a fixed plane, and often the variation of the glass surface across the sheet is larger than the glass thickness itself. Since such relatively large pieces of glass may have a thickness of only about 0.7 mm to about 1.1 mm, they have a tendency to sag and bow. Further, when inspecting liquid crystal display glass, if anything were to touch the surface of either the front or the back of such glass, it would create a defective piece, and accordingly such glass pieces must be handled only by edge portions thereof. To illustrate the problem of sag, if a piece of 850×900 mm×0.7 mm glass were laid horizontally and supported only by the edges, the piece would sag in the center about 2 to 3 inches, whereas if the same piece were supported vertically, the sag would be much less, however, the piece would still bow somewhat in one direction or the other.

When utilizing a high magnification objective greater than 20×, many times it becomes virtually impossible to image the particles on both surfaces of a glass specimen because the working distance of such objectives is often less than the thickness of the glass sheet. Extra long working distance objectives (ELWDs) can help to alleviate some of these issues, but ELWDs are often more expensive than conventional objectives. Accordingly, the sheet must be turned over or reversed in order to image both the front and back surfaces, thus requiring a second set up.

It thus has been an object of the invention to provide a focusing filament technique which furnishes a solution to the problems set forth in the prior art, by providing an absolute surface reference that can automatically compensate for variations of the glass position-relative to a plane, and which also may be used with relatively low magnification objectives of about 10× to 20× that have a fairly large working distance of about approximately 7 to 10 mm.

SUMMARY OF THE INVENTION

The present invention sets forth a method and a structure for providing automatic focusing on a designated surface of a glass specimen through the utilization of a thin filament positioned in the light path of an inspection system. The filament is positioned such that it is focused to the same plane as the objective lens used to image a particle on the glass. A shadow of the filament can be seen in the field of view when the objective is focused on either the front or back surface of the glass, using bright field illumination. Since the shadow of the filament appears on either the front or back surface of the glass specimen, it provides an absolute surface reference that can automatically compensate for variations of the glass position relative to a plane.

DESCRIPTION OF THE PREFERRED EMBODIMENTS

Figure 1:
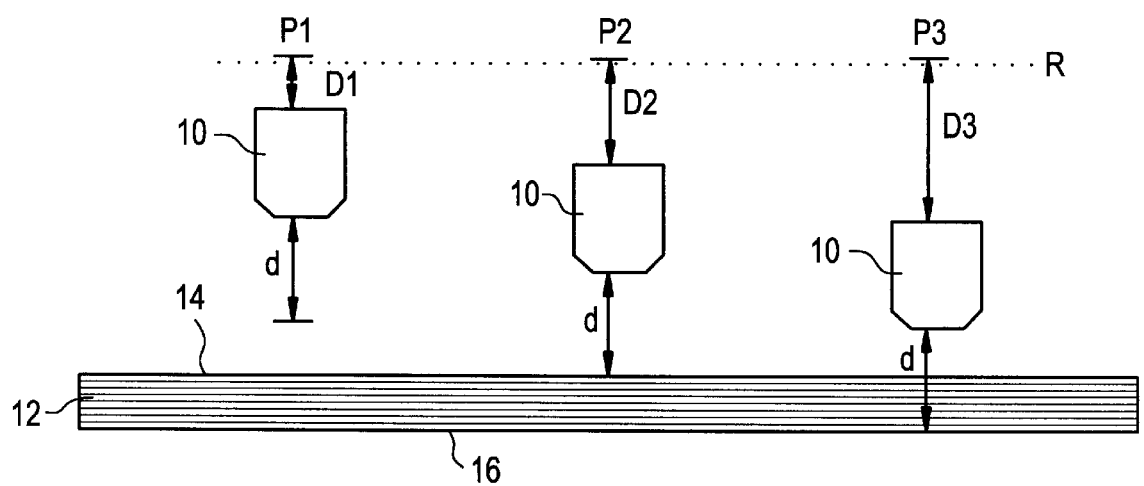
FIG. 1 is a schematic illustration of focusing on both surfaces of a planar glass sample from a reference line.

In order to better understand the contribution of the present invention in the art of automatic focusing in inspection systems, the problems of focusing an objective on a given surface, which surface may not lie wholly within a particular plane, will be discussed. Since most auto focusing techniques rely upon a calibrated axis, they assume the specimen is always at the same point in space. However, large variations in the location of the specimen cause erroneous results from such auto focusing techniques. Referring now to FIG. 1, an objective lens 10 having a fixed focal length d, is shown as being located at three different positions P1, P2 and P3 from a calibrated axis or reference location R. A glass specimen 12 having an upper surface 14 and a lower surface 16 is positioned relative to the reference axis R. As shown in FIG. 1, the upper and lower surfaces of the glass specimen 12 are perfectly smooth and parallel to the reference axis R. Since the location R is in fact a reference location whose position is therefore known, an axis can be calibrated to determine the precise positions corresponding to distances D1, D2 and D3. As shown in FIG. 1, when the objective lens 10 is positioned at a distance D2 from the reference axis R, the top surface 14 of the specimen 12 will be in focus with the objective lens 10. Similarly, the bottom surface 16 of the glass specimen 12 will be in focus with the objective lens 10 when the lens is positioned at a distance D3 from the reference axis R, as shown at position P3. At position P1, the objective lens 10 at a distance D1 from the reference axis R does not yield anything in focus, since the fixed focal length d did not even reach the glass specimen 12.

Figure 2:
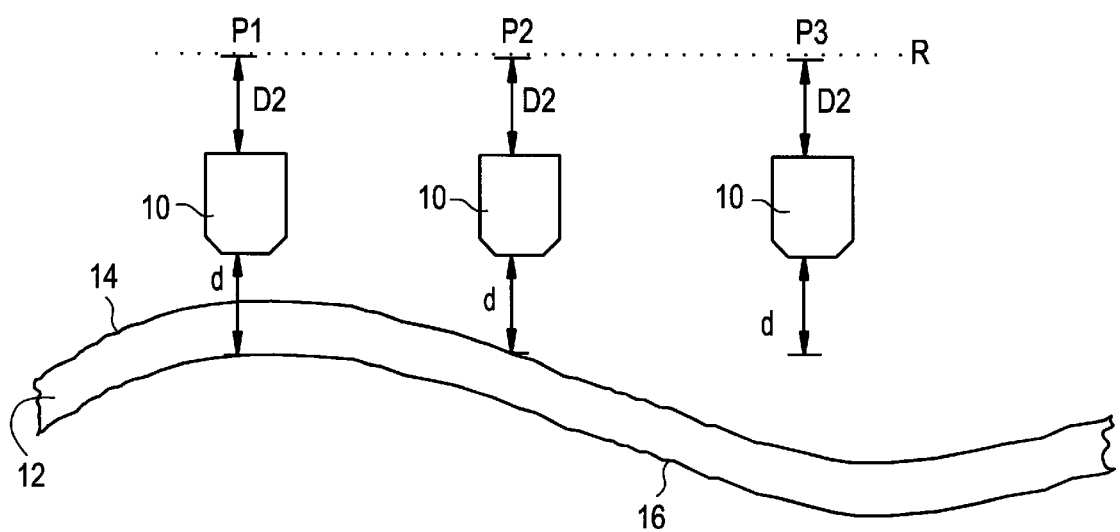
FIG. 2 is a schematic illustration of focusing on a bowed glass sample from a reference line.

In FIG. 2, the objective lens 10 is shown at positions P1, P2 and P3 as being at the same distance D2 from the reference axis R. However, the glass specimen 12 is shown having a bowed curvature, such that the upper and lower surfaces 14, 16 do not lie in a plane parallel to the reference axis R. In addition, the upper and lower surfaces 14, 16 of the specimen 12 shown in FIG. 2 are not smooth and have variations in their surface contours. With the objective lens 10 having a given working distance d being located at a given distance D2 from the reference axis R at all positions P1, P2 and P3, objective lens 10 may be in focus with different portions of the specimen 12 due to the fact that the specimen is bowed and is not planar with respect to the reference axis R. At position P1, the objective lens 10 is in focus with the bottom surface 16 of the specimen. At position P2, the objective lens is in focus with the top surface 14 of the specimen, whereas at position P3, the objective lens is not in focus with any part of the specimen 12. Therefore, when the amount of variation or bow in a surface of a specimen cannot be controlled relative to a plane, it is virtually impossible to use a calibrated axis to correctly determine which surface an objective is focused upon so as to ascertain the position of a particular defect or particle on a surface of a specimen.

Some techniques are available in the art for compensating for variations from a fixed plane, however they are limited to high magnification objectives (>20×), which have a narrow depth of focus and short working distances. Then too, as pointed out in FIG. 2, the variation in distance of the glass surface across the sheet from a reference plane may be larger than the glass thickness. Many times it is not possible to image the particles on a surface using a high magnification objective, because the working distance of these objectives is often less than the glass thickness, thus requiring the specimen to be turned over in order to image both the front and back surfaces. This problem is illustrated more clearly in FIG. 3.

Figure 3:
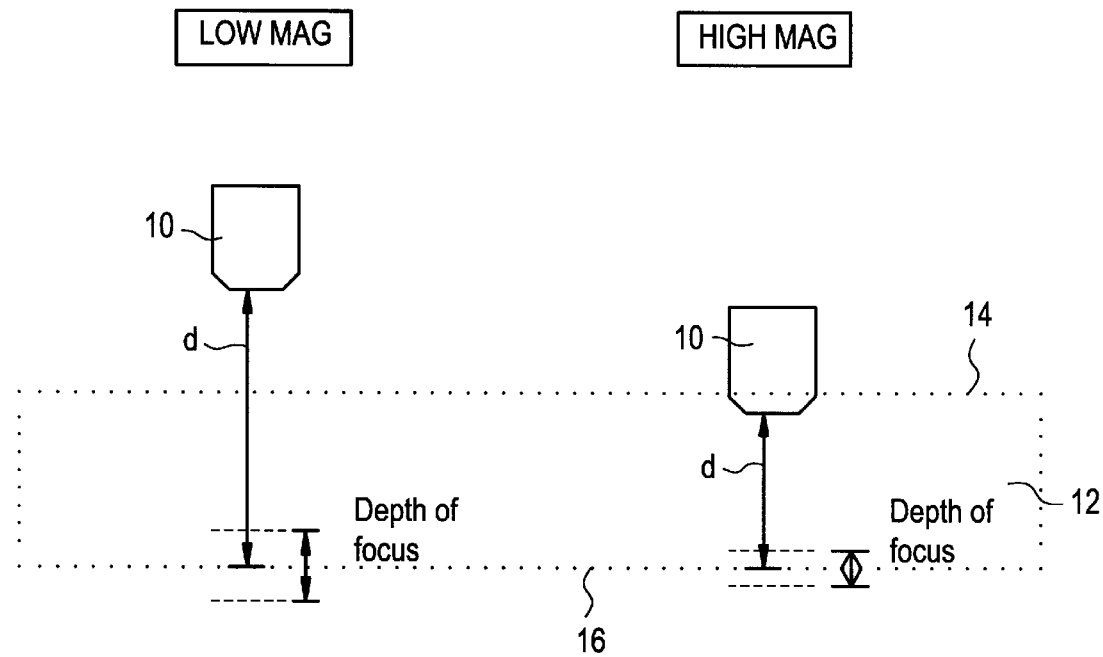
FIG. 3 is a schematic illustration illustrating variation in depth of focus and working distance of objectives having low magnification of about 10× to 20× and high magnification of greater than 20×.

In general, the higher the magnification, the narrower the depth of focus and the shorter working distance of an objective lens. FIG. 3 illustrates two examples, one using an objective lens with low magnification, designated LOW MAG, and the other utilizing a high magnification objective lens 10 designated as HIGH MAG. The working distances or fixed focal lengths of the objectives 10 is shown at d, wherein the HIGH MAG lens 10 has a shorter working distance d than that of the LOW MAG lens. Also, as shown in FIG. 3 the depth of focus of the HIGH MAG objective lens 10 is much narrower than the depth of focus of the LOW MAG objective lens 10. Some auto focus techniques that use lasers rely on the small depth of focus of HIGH MAG objectives in order to pinpoint the surface. However, since most of these objectives have a working distance d that is smaller than the glass thickness, the operation requires that the glass specimen be turned over in order to examine both sides. If the specimen were not reversed, the objective lens would touch the sample surface before the bottom surface would come into focus, and would actually impact the upper surface 14 of a specimen 12 as shown by the HIGH MAG objective lens 10 in FIG. 3.

When inspecting a glass sheet for defects or particles upon its surface, it is necessary to identify on which surface such defects or particles exist. By positioning a thin filament in the light path of an inspection system so that it is focused to the same plane as the objective lens used to image a particle on a glass sheet, an image or a shadow of the filament can be seen in the field of view when the objective is focused on either the front or back surface of the sheet using bright field illumination. The thin focusing filament can be arranged in the light path when using either reflected or transmitted illumination. Moving the objective away from either the front or back surface of the glass specimen, by focusing the objective internally to the body of the glass, causes the shadow of the focusing filament to disappear. The diameter of the focusing filament image in the field of view is determined by the lenses that are used to focus the filament at the sample surface. By using a 20× objective, the image is about ¼ the actual size of the filament, which may have a thickness of less than about 3 mm, preferably less than about 100 μm. Thinner filaments would even give a more distinct line in the image which can be positioned off to the side of the field of view.

The optical configuration of the invention includes a Kohler illumination set up. Whereas in a Kohler illumination the image of the field diaphragm is focused on the specimen surface, and the image of an undiffused lamp source is focused in the plane of the aperture diaphragm, in the present invention the field diaphragm is effectively replaced by a filament. Thus the focusing filament may be positioned in the epi-illuminator at the field diaphragm location. A benefit is obtained in that it is now possible to switch between brightfield and darkfield illumination without having to adjust the field diaphragm.

Figure 4:
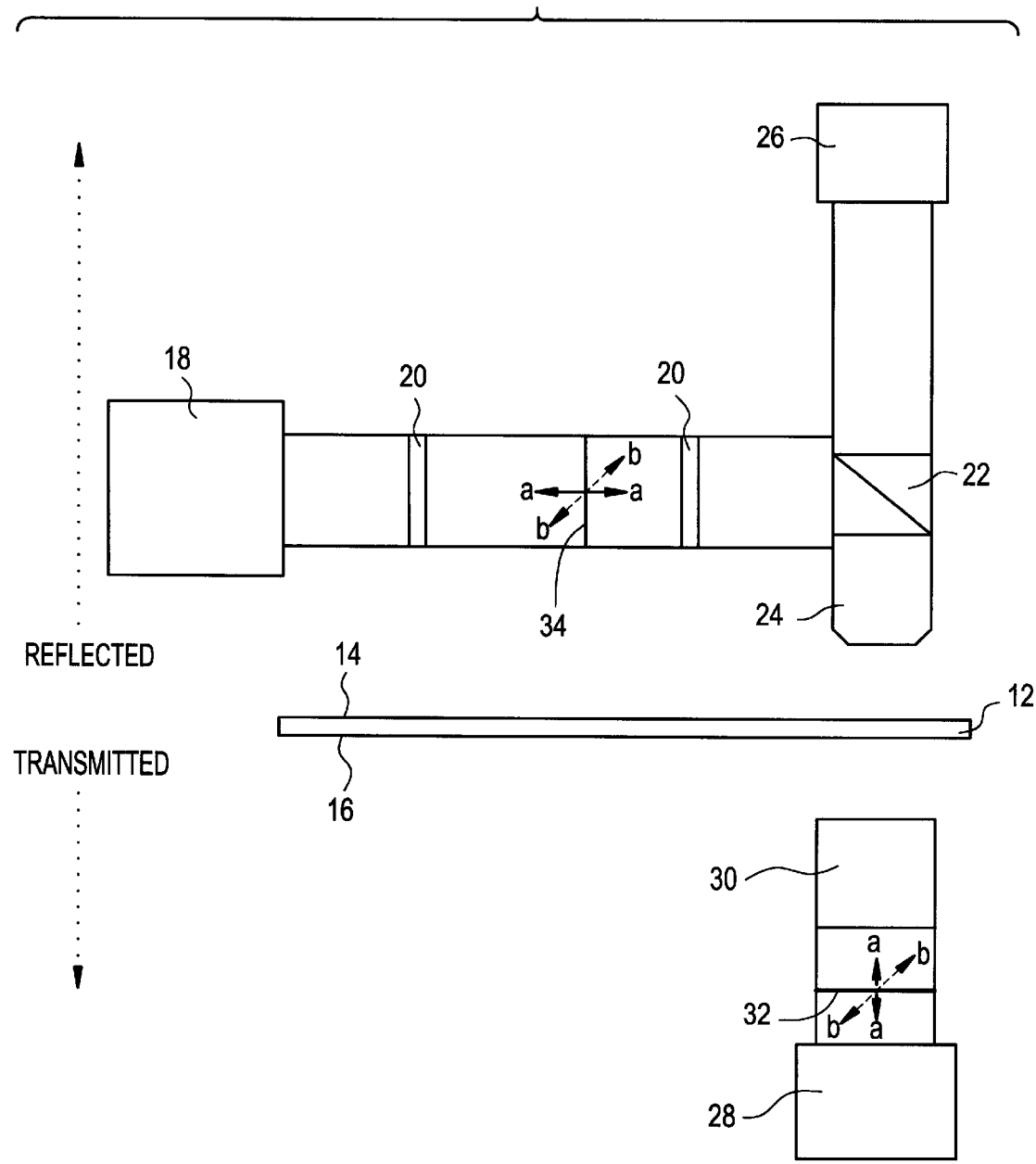
FIG. 4 is a schematic illustration of an optical arrangement for utilizing the focusing filament technique of the present invention.

As shown in FIG. 4, an inspection system for a glass specimen sheet 12 having an upper surface 14 and a lower surface 16 includes a lamp house 18 for providing reflected lighting, a pair of optical elements 20, and a brightfield mirror block 22. An objective lens such as a microscope objective 24 is positioned adjacent the specimen 12. A viewing lens or a video camera 26, is positioned to receive an image.

An additional lamp house 28 is shown for providing transmitted lighting, and condenser lens optical components 30 are in axial alignment with the lamp house 28. A pair or focusing filaments 32, 34 are shown positioned within the inspection system. The two locations 32, 34 of the focusing filament are for two different lighting scenarios, transmitted and reflected. Only one focusing filament is used at a time, that is the upper filament 34 is utilized with reflected illumination, whereas the lower focusing filament 32 is utilized with transmitted illumination. It is possible to achieve darkfield or brightfield illumination using either reflected or transmitted light. However, the image of the focusing filament is only seen using brightfield illumination. When the objective is focused at the sample surface, an image of the filament can be seen focused at the sample surface.

Although the focusing filaments may be positioned manually by moving the focusing filament along the optical axis as shown by arrows a-a until the filament is in focus as seen in the optics, the lenses that are chosen to focus the filament to the specimen surface should define its position. The focusing filaments may be mounted to a slide mechanism, such that to focus a focusing filament on the specimen surface, it may be slid forward or backward along the slide of optical axis a—a. To position the focusing filament within the field of view off to one side or the other, it is slid along an axis b—b perpendicular to the optical axis a—a.

After the focusing filament has been moved along the optical axis until it is in focus, as seen in the optics, and it is focused on the specimen surface, the upper and lower surfaces of the glass specimen can be identified. As the objective lens is moved toward the glass specimen, a shadow of the focusing filament will appear in the optic lens or camera's field of view. The first time that it is seen, the objective will be focused upon the top or upper surface of the specimen. As the objective continues to move in the same direction, the focusing filament disappears from the image as the focal point passes through the interior of the glass specimen. However, the focusing filament reappears when the objective has moved enough so as to focus on the back or bottom surface of the specimen. The principle of focusing the shadow of the focusing filament on the top and bottom surfaces of a specimen may be used to facilitate auto focusing, since edge algorithms can be customized to search for the same object at the same location within the field of view every time. The edge algorithm is just one way to automatically find the focusing filament, although it can be viewed manually to find a particular surface of the glass, as mentioned above. In order for the focusing filament to function correctly, it must be placed within the inspection system so that it is in focus at precisely the same time as the surface of the glass is in focus with the objective lens.

Figure 5:
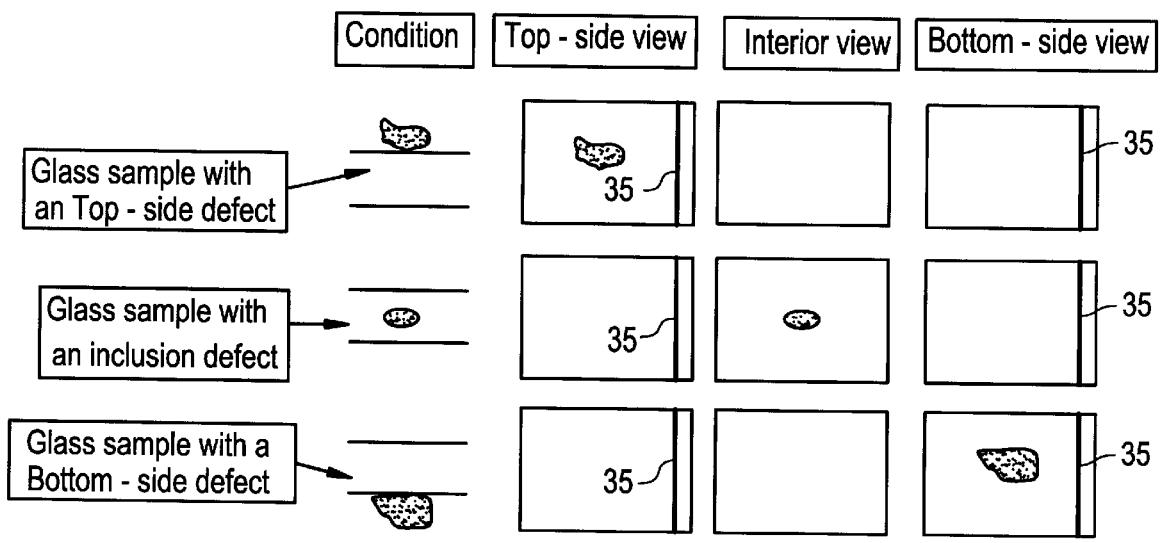
FIG. 5 is a schematic illustration showing the appearance of the focusing filament shadow in the field of view but on various surfaces.

FIG. 5 shows various images which are seen by the ccd camera or optic lens when the glass sample has a defect on the top side, when the glass has an inclusion defect, and when the glass sample has a defect on the bottom side. As noted, the shadow 35 of the focusing filament as seen in the field of view of the optic lens, is positioned off to one side of the field of view. The purpose of positioning the filament to the side of the field of view is simply so that it does not interfere with the image of the particle or defect located on the surface.

In the first condition, the glass sample has a top side defect, and when the objective focuses on the top side of the specimen sample, the shadow 35 of the focusing filament appears in the image, but then disappears as the focus moves through the interior of the sample, however the shadow then reappears as the objective focuses on the bottom side of the sample. In the second condition, where the glass sample has an inclusion defect, the shadow 35 shows up on the top surface, but disappears when the image of the inclusion is found, and then reappears when the objective is focused on the bottom surface. In the final condition where the glass sample has a defect on the bottom side, the shadow 35 of the focusing filament appears on the top side, disappears as the focus passes through the interior of the sample, and reappears as the objective focuses on the bottom side of the sample to image the defect.

Thus, the imaging of the focusing filament on a surface, and its disappearance as the focus passes through the interior of the sample and its reappearance on the opposite side of the sample is an important facet of the invention by identifying where the defect resides in the glass. The focusing filament technique provides an absolute surface reference that can automatically compensate for variations of the glass position relative to a plane, and also can be used with relatively low magnification objective lenses, below 20×, and have a fairly large working distance of approximately 7–10 mm.

Although I have disclosed now preferred embodiments of the invention it will be apparent to those skilled in the art that various changes and modifications may be made thereto without departing from the spirit and scope of the invention as defined in the appended claims.

I claim:

1. A method of producing an auto focusing system having at least one light source and an objective lens which comprises, placing a filament in a light path between the light source and the objective lens, said filament having a longitudinal axis, positioning the filament within said light path such that during use of the system, the filament can be focused on a specimen surface, so as to function as a focusing filament, and forming an image of said filament in the field of view when said objective lens is focused on a surface of a specimen so as to identify such surface, wherein the objective lens has an optical axis and the filament's longitudinal axis is perpendicular to that optical axis.

2. A method of producing an auto focusing system having at least one light source and an objective lens as defined in claim 1 including the step of utilizing the image of said filament for providing an absolute surface reference that automatically compensates for variations of a specimen's position relative to a fixed plane.

3. A method of producing an auto focusing system having at least one light source and an objective lens as defined in claim 1 wherein the filament has a thickness of less than about 3 mm.

4. A method of producing an auto focusing system having at least one light source and an objective lens as defined in claim 1 wherein the filament has a thickness of less than about 100 µm.

5. A method of producing an auto focusing system having at least one light source and an objective lens as defined in claim 1 including the step of moving said filament along an optical axis so as to focus the filament in the same plane as the objective lens uses to image a defect on the surface of a specimen.

6. A method of producing an auto focusing system having at least one light source and an objective lens as defined in claim 1 including the step of moving said filament transverse to an optical axis so as to position said image off to one side of said field of view.

7. A method of producing an auto focusing system having at least one light source and an objective lens as defined in claim 1 including the step of providing one light source for transmitted illumination and an other light source for reflected illumination.

8. A method of producing an auto focusing system having at least one light source and an objective lens as defined in claim 7 including the step of providing one filament in the light path of said one light source, and providing a separate filament in the light path of said other light source.

9. A method of producing an auto focusing system having at least one light source and an objective lens as defined in claim 1 including the step of focusing an image of the focusing filament to the plane of said objective lens used to image a defect on the surface of a specimen.

10. The method of claim 1 including the step of switching between brightfield and darkfield illumination.

11. The method of claim 10 wherein the switching between brightfield and darkfield illumination is performed without adjusting a field diaphragm of an illumination system.

12. A method of producing an auto focusing system having at least one light source and an objective lens which comprises, placing a filament in a light path between the light source and the objective lens, positioning the filament within said light path such that during use of the system, the filament can be focused on a specimen surface, so as to function as a focusing filament, and forming an image of said filament in the field of view when said objective lens is focused on a surface of a specimen so as to identify such surface, wherein the specimen is a glass specimen and the method further comprises the steps of moving the objective lens toward the glass specimen and identifying the upper surface thereof by the image of the focusing filament in the field of view, continuing moving the objective lens toward the glass specimen causing the image of the focusing filament to disappear, and continuing moving the objective lens toward the glass specimen until the image of the focusing filament reappears on the lower surface to identify the lower surface.

13. The method of claim 12 including the step of identifying a defect as being a first surface defect, an inclusion defect, or a second surface defect.

14. A method of inspecting opposite surfaces and the interior of glass sheet for defects and identifying the location of such defects which comprises, provewing an optical inspection system with a focusing filament in a light path between a light source and an objective lens, positioning said focusing filament so that it is focused to the same plane that the objective lens uses to image a defect on a surface of the glass sheet, moving said objective lens toward said glass sheet until a shadow of said focusing filament appears in a field of view and thereby identifying a first surface of said glass sheet, causing said shadow to disappear by moving the focal point of said objective lens through the interior of said sheet, as the lens is moved further toward the glass, continue moving the objective lens toward said glass sheet until the shadow of said focusing filament reappears in the field of view thereby identifying a second surface of the glass sheet, and identifying a defect as being a first surface defect, an inclusion defect, or a second surface defect.

15. A method of inspecting opposite surfaces and the interior of glass sheet for defects as defined in claim 14 including the step of moving said focusing filament transverse to an optical axis so as to position said shadow to one side of said field of view and away from any defect noted in the glass surface.

16. A method of inspecting opposite surfaces and the interior of glass sheet for defects as defined in claim 14 including the step of utilizing said focusing filament to provide an absolute surface reference for automatically compensating for variations in the positioning of the glass sheet relative to a plane.

17. A method of inspecting opposite surfaces and the interior of glass sheet for defects as defined in claim 14 including the step of providing an objective lens with a magnification of not greater than 20×, and a working distance of up to about 7–10 mm.

18. The method of claim 14 including the step of switching between brightfield and darkfield illumination.

19. The method of claim 18 wherein the switching between brightfield and darkfield illumination is performed without adjusting a field diaphragm of an illumination system.

20. Apparatus for inspecting opposite surfaces of glass specimens comprising:

at least one light source, an objective lens, a filament provided within a light path of said light source, and means for focusing said filament on a specimen surface so as to form an image of said filament in a field of view when said objective lens is focused on a surface of a glass specimen, wherein the objective lens has an optical axis and the filament is perpendicular to that optical axis.

21. Apparatus for inspecting opposite surfaces of glass specimens as defined in claim 20 including a first light source for reflected illumination and a second light source for transmitted illumination, and a first focusing filament is positioned in the light path of said first light source and a second focusing filament is positioned in the light path of the second light source.

22. Apparatus for inspecting opposite surfaces of glass specimens as defined in claim 20 wherein said objective lens has a magnification of below 20× and a working distance of up to about 7–10 mm.

23. Apparatus for inspecting opposite surfaces of glass specimens as defined in claim 20 wherein said filament has a thickness less than about 3 mm.

24. Apparatus for inspecting opposite surfaces of glass specimens as defined in claim 20 wherein said filament has a thickness less than about 100 Nm.

25. The apparatus of claim 20 further comprising means for switching between brightfield and darkfield illumination.

* * * * *